United States Patent
Johnson et al.

(10) Patent No.: US 8,689,589 B2
(45) Date of Patent: Apr. 8, 2014

(54) WASHER/EXTRACTOR WITH PLASTIC HOSE CONNECTING FITTING

(75) Inventors: Daryl T. Johnson, Ripon, WI (US); Benjamin L. Sheets, Ripon, WI (US)

(73) Assignee: Alliance Laundry Systems, LLC, Ripon, WI (US)

( * ) Notice: Subject to any disclaimer, the term of this patent is extended or adjusted under 35 U.S.C. 154(b) by 1045 days.

(21) Appl. No.: 12/749,023

(22) Filed: Mar. 29, 2010

(65) Prior Publication Data

US 2011/0232335 A1    Sep. 29, 2011

(51) Int. Cl.
*D06F 39/08*    (2006.01)

(52) U.S. Cl.
USPC .................................................. 68/207

(58) Field of Classification Search
USPC ............................ 68/207; 4/695; 137/343, 360
See application file for complete search history.

(56) References Cited

U.S. PATENT DOCUMENTS

| | | | | |
|---|---|---|---|---|
| 2,643,665 A * | 6/1953 | Stocking | ................... | 137/216.1 |
| 3,381,700 A * | 5/1968 | Roland | ......................... | 137/216 |
| 3,868,968 A * | 3/1975 | Fuhrmann | ............... | 137/624.18 |
| 4,280,527 A | 7/1981 | Pease | | |
| 4,307,588 A * | 12/1981 | Smith et al. | ................. | 68/23.7 |
| 5,029,606 A * | 7/1991 | Kuhlthau, Jr. | ............... | 137/360 |
| 5,425,255 A * | 6/1995 | Pick | ................................ | 68/207 |
| 5,560,231 A * | 10/1996 | Hwang | ........................... | 68/207 |
| 2007/0137263 A1 * | 6/2007 | Cho et al. | ....................... | 68/140 |

FOREIGN PATENT DOCUMENTS

DE    19548477 A1 *    6/1996    ............. D06F 39/08

OTHER PUBLICATIONS

Machine translation of DE 19548477 A1, no date.*
UK Search Report, dated Jul. 7, 2011, in corresponding UK application No. GB1104213.2.

* cited by examiner

*Primary Examiner* — Joseph L Perrin
(74) *Attorney, Agent, or Firm* — Leydig, Voit & Mayer, Ltd.

(57) ABSTRACT

A washer/extractor having a one-piece plastic water hose connecting fitting having a base plate, a tubular hose connection portion that defines a passageway communicating between a hose connected to the fitting and an opening in the wall to which the fitting is mounted, and a pair of clamping members disposed in parallel relation to a rear side of base plate. The wash tub opening has a key hole configuration which enables the arms of the fitting to be positioned into the opening in a first position of the base and upon rotation of the base plate to a second position locates the clamping arms behind mounting portions of the wall for securement by respective fasteners extending through the base plate, wall mounting portions, and clamping arms.

15 Claims, 4 Drawing Sheets

WASHER/EXTRACTOR WITH PLASTIC HOSE CONNECTING FITTING

FIELD OF THE INVENTION

The present invention relates generally to laundry washer/extractors, and more particularly, to an improved hose connection arrangement for connecting water or other liquid supply hoses to the wash tubs of the washer/extractors.

BACKGROUND OF THE INVENTION

In clothes washer/extractors used in commercial and public establishments, water supply hoses commonly are connected to a metal tubular fitting welded to the back of the wash tub of the washer/extractor. The hose is positioned over and secured to the fitting for the purpose of supplying wash water to the tub. Such tubular fittings commonly are made of stainless steel in order to resist corrosion caused by exposure to laundry chemicals. Due to the positioning and angle of such tubular fittings, it can be difficult obtain a secure and water tight weld with the wall of the metal wash tub. The metal fitting also is a relatively expensive part because of the stainless steel material and the processes required to manufacture the part and reliably secure it to the wash tub.

While plastic hose connecting fittings have been used to connect water supply hoses to the wash tub, heretofore such fittings must be installed from inside the tub and then a locking nut is screwed onto a hose connecting portion of the fitting from outside of the tank to hold the fitting in place and create a water tight seal with a compression gasket interposed between the fitting and wash tub wall. Such hose connecting fittings have not allowed for replacement of the fitting without access to the interior of the wash tub, which is a significant draw back for field service if a damaged fitting requires replacement. With such plastic fittings, a protruding hose connecting tube must be externally threaded for receiving the fastening nut. This further requires that the tube be oriented perpendicular to the wall of the wash tub in which the fitting is secured, which may not be an optimum angle for most efficiently directing water into the wash tub without leakage about the fitting.

OBJECTS AND SUMMARY OF THE INVENTION

It is an object of the present invention to provide a washer/extractor with an improved fitting for connecting water or other liquid supply hoses to the wash tub.

Another object is to provide a wash tub hose connecting fitting which can be installed and removed from outside the wash tub without welding.

A further object is to provide a relatively low cost plastic molded hose connecting fitting as characterized above which can be more easily installed and which facilitates field replacement.

Still another object is to provide a plastic hose connecting fitting of the foregoing type which has a protruding hose connecting tube oriented at an acute angle to the wash tub upon which the fitting is mounted for optimum direction of water into the wash tub.

Yet another object is to provide a plastic fitting of the above kind that can be mounted in a washer/extractor in the foregoing manner for use with other accessory items.

Other objects and advantages of the invention will become apparent upon reading the following detailed description and upon reference to the drawings, in which:

Figure 1:
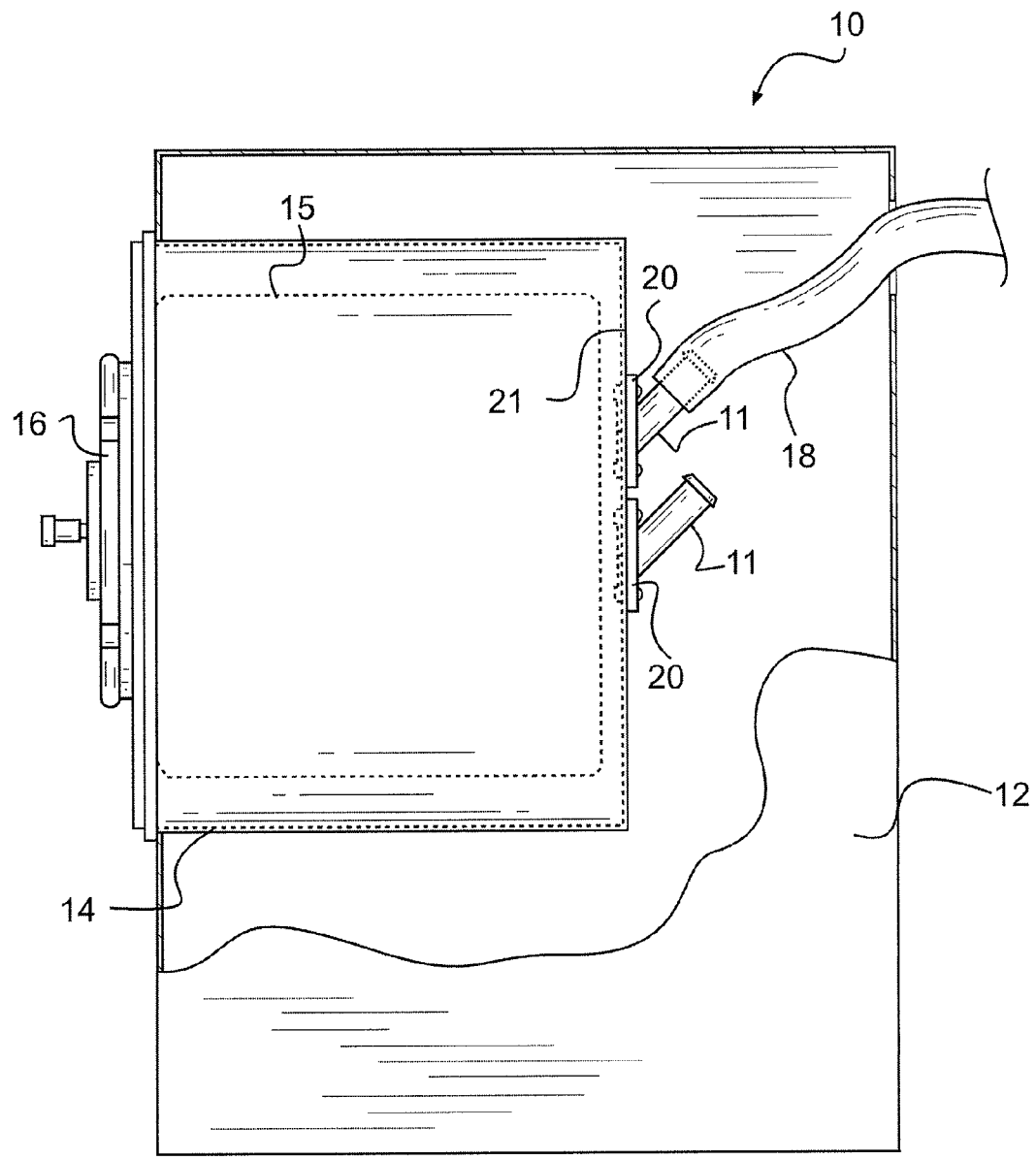
FIG. 1 is a side elevational view of an illustrative washer/extractor having water hose connecting fittings in accordance with the invention.
Figure 2:
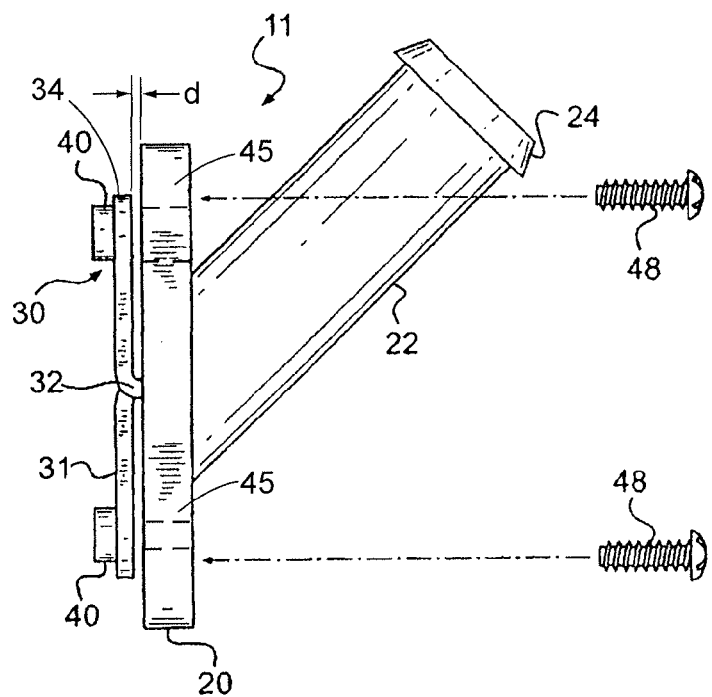
FIG. 2 is an enlarged side elevational view of one of the hose connecting fittings of the illustrated washer/extractor.
Figure 3:
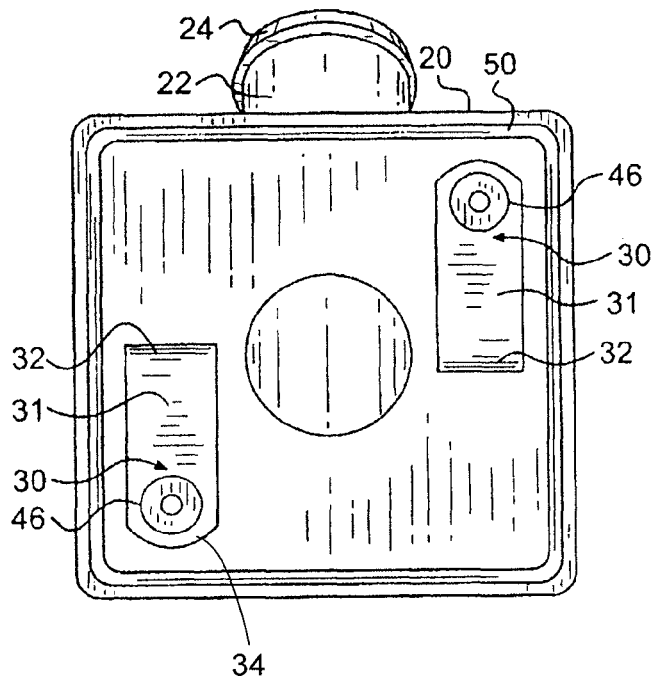
FIG. 3 is a rear view of the hose connecting fitting shown in FIG. 2.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Referring now more particularly to the drawings, there is shown an illustrative washer/extractor 10 having a plurality water supply hose connecting fittings 11 in accordance with the invention. The illustrated washer/extractor 10 is a washing machine of a type commonly referred to in the trade as a pocket hard mount washer, comprising a cabinet 12 supporting a wash tub 14, a rotatably driven tumbler 15 within the wash tub 14 for receiving clothing or other items to be washed, and a front opening access door 16 to the wash tub 14 and tumbler 15. For supplying water to the wash tub 14 during selected wash and rinse cycles, one or more water supply hoses 18 are provided which each is controlled by a respective control valve in a conventional manner. Since the hose connecting fittings 11 in this case are identical in construction, only one need be described in detail. Moreover, as will be appreciated by one skilled in the art, for clarity of description with respect to hose connection fittings, conventional components and accessories of the illustrated washer/extractor have been omitted in FIG. 1.

In accordance with the present invention, each hose connecting fitting has a plastic molded construction adapted for easy mounting and replacement from outside the wash tub. To this end, in the illustrated embodiment, each fitting 11 has a base plate 20 mountable on an outer surface of a rear wash tub wall 21 and an outwardly extending tubular hose connecting portion 22 about which a water supply hose 18 can be clamped or otherwise secured in a conventional manner. The tubular hose connecting portion 22 in this case has a radially extending annular lip 24 at its terminal end to facilitate a sealed connection. The tubular hose connecting portion 22 defines a water flow passageway 25 communicating from the hose 18 through the base plate 20 and wash tub wall 21, and into the interior of the wash tub 14.

The connecting fitting base plate 20 in this case has a generally rectangular configuration and is provided with a pair of clamping members or tabs 30 adjacent diametrically opposed corners of the base plate 20. The illustrated clamping members 20 each include a clamping arm 31 and a connecting portion 32 that supports the clamping arm 31 in rearwardly spaced parallel relation to the base plate 20. The clamping arms 31 in this case extend in parallel opposing relation to each other, each having a terminal end 34 disposed short distance "d" of a respective opposite edge of the base mounting plate 20.

Figure 4:
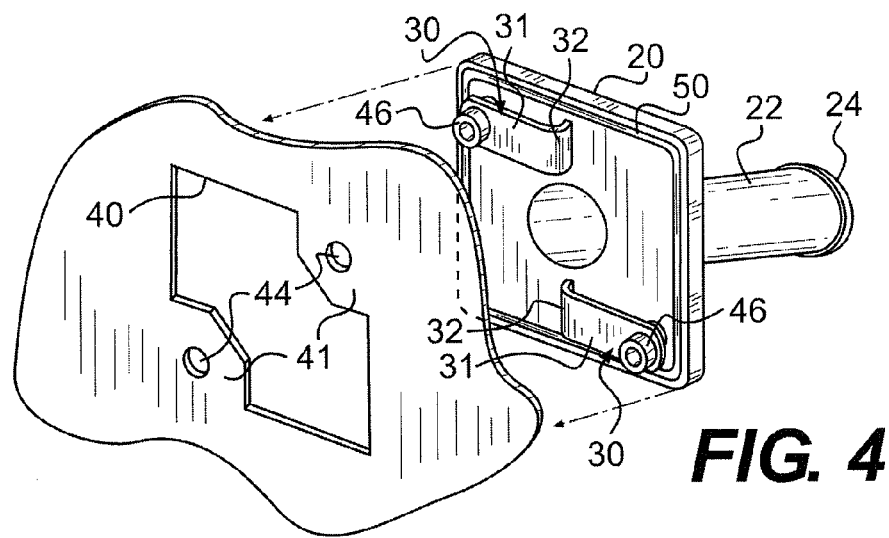
FIGS. 4-6 are sequential perspective views illustrating the mounting of the hose connecting fitting within a wall of the wash tub of the illustrated washer/extractor.
Figure 5:
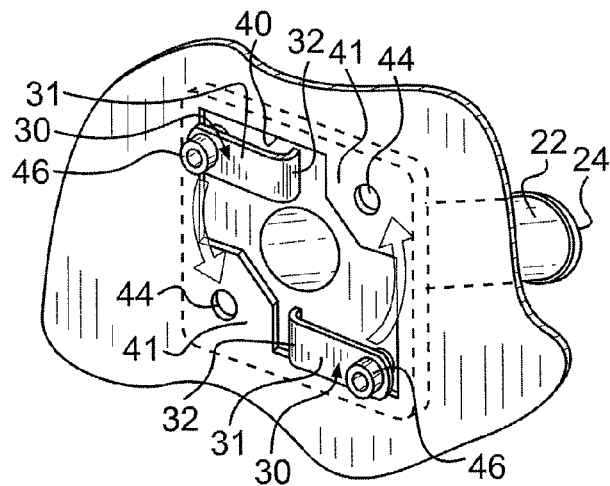

In keeping with the invention, the hose connecting fitting 11 is mountable within a keyed opening 40 of the wash tub wall 21. The keyed opening 40 in this case has a generally rectangular configuration, sized slightly smaller than the fitting base plate 20, with a pair of extending mounting flanges 41 at diametrically opposed corners of the opening 40. The keyed opening 40, while smaller than that of the base plate 20, is sufficiently large to receive the clamping members 30 when positioned into corners 40a of the opening 40 opposite the mounting flanges 41, as depicted in FIGS. 4 and 5. With the clamping members 30 positioned into the keyed opening 40 in that manner, the fitting 11 can then be rotated to locate the clamping arms 31 adjacent back sides of the wash tub wall mounting flanges 41 in aligned relation thereto. To facilitate such rotation of the connecting fitting 11, the clamping arms 31 are spaced a distance slightly greater than the thickness of the wash tub wall 21. Hence, in the rotated position, as depicted in FIG. 6, the perimeter of the base plate 20 is disposed adjacent an outside wall surface of the wash tub wall 21 in surrounding relation to the keyed opening 48 and the clamping members 30 are disposed adjacent a rear side of the diametrically opposed wall mounting flanges 41.

To facilitate secure mounting of the fitting 11 on the wash tub wall 21, the wall mounting flanges 41 each are formed with a respective fastener receiving mounting aperture 44, and the fitting base plate 20 is formed with a pair of mounting apertures 45 at diametrically opposed corners coincident with the mounting flange apertures 44. Each clamping member 31 further is formed with a respective rearwardly extending cylindrical fastener receiving nib 46.

Figure 6:
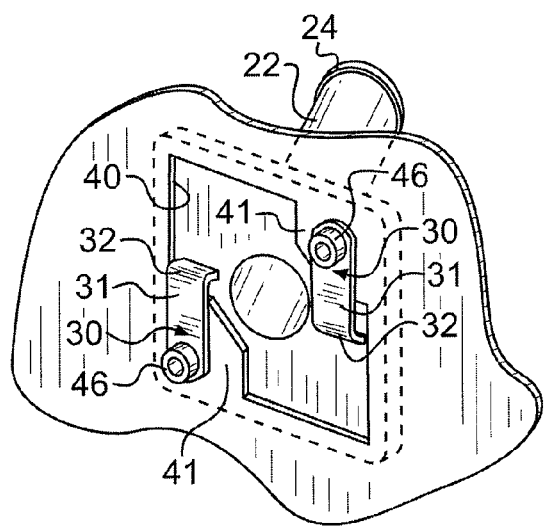
Figure 7:
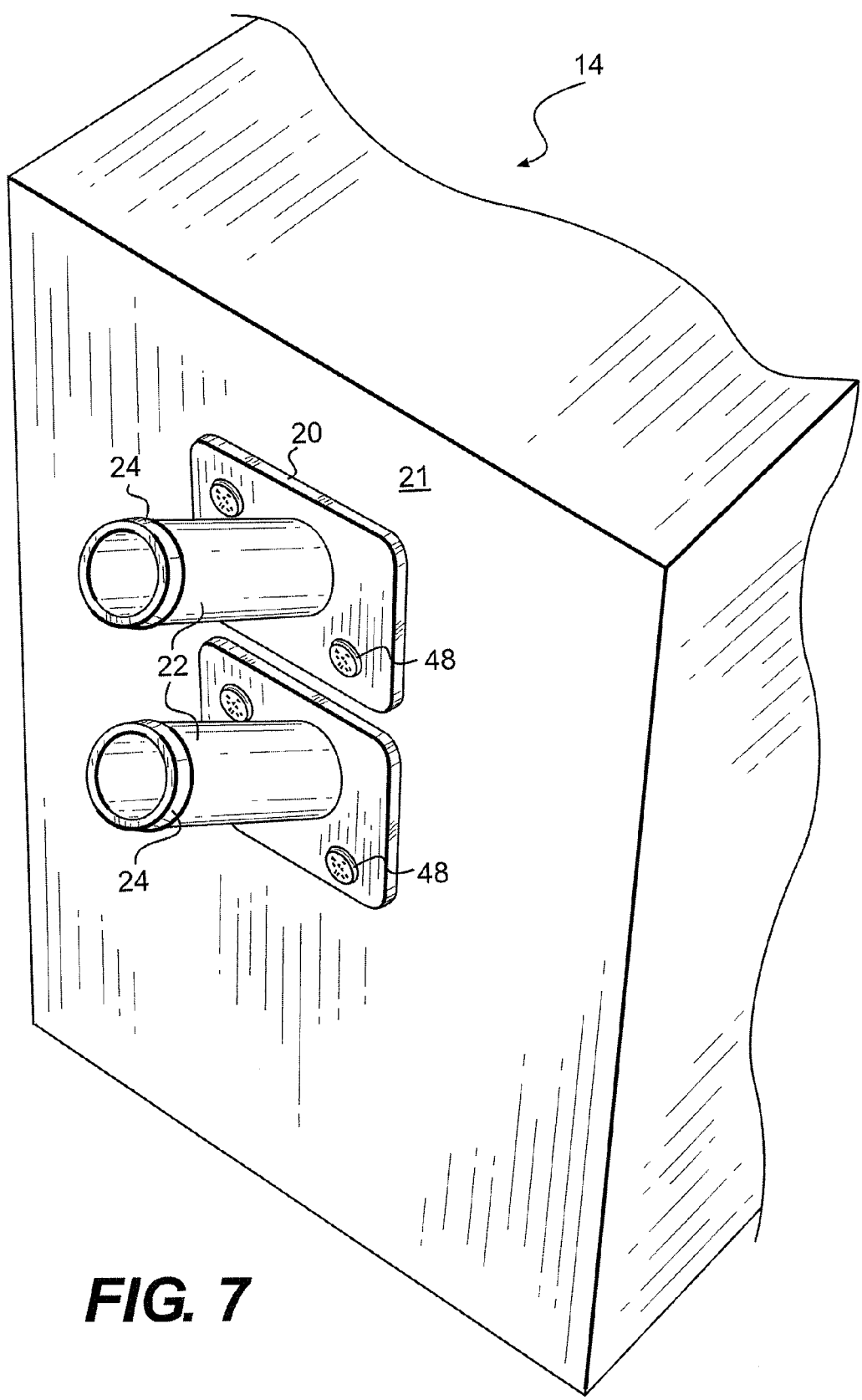
FIG. 7 is a rear perspective showing a pair of the fittings in mounted position.

In the rotated position as depicted in FIG. 6, therefore, the fitting 11 can be easily secured to the wash tub wall 21 by a pair of self tapping screws 48 that extend through the aligned wash tub wall, base plate and mounting flange apertures 44, 45, 46, and threadedly engage the clamping member nibs 46 to draw the clamping members 31 and base plate 20 into tight fitting engagement with the wash tub wall.

For providing a seal between the hose connecting fitting 11 and the wash tub wall 21, a rectangular gasket 50 is interposed between the rear side of the fitting base plate 20 and the wash tub wall 21. Preferably the fitting base plate 20 is formed with a rectangular gasket receiving recess 51 sized to support the gasket 50 during mounting and rotational positioning of the fitting 11, while protruding outwardly from the base plate sufficient to sealingly engage the front surface of the wash tub wall 21 upon securement. The base plate mounting apertures 46 preferably are sized smaller than the self tapping screws 48 such that upon mounting of the fitting 11 the screws 48 also sealingly engage the base plate 20.

Since the hose connection fitting 11 can be mounted in the wash tub wall 21 without the necessity for threading of a retaining nut on the tubular hose receiving portion 22, it will be appreciated by one skilled in the art that the tubular hose receiving portion 22 may be formed at an angle to the base plate 20 for optimum direction of water into the wash tub. In this case, the tubular hose mounting portion 22 is disposed at an angle of about 45° to the base plate, and hence to the wash tub wall 21, for directing water from the water supply hose 18 in a downward and inward direction.

From the foregoing, it will be appreciated by one skilled in the art that the hose connecting fitting can be economically produced by injection molding and efficiently mounted on the wash tub wall and removed for service or replacement if necessary, completely from outside the wash tub. While in the illustrated embodiment each water supply hose is connected to a respective fitting, it will be understood that alternatively the fitting base plate may be integrally formed with a plurality of tubular hose connecting portions each for connection with a respective water supply hose. Moreover, while the invention has been described in connection with liquid hose connecting fittings, the invention is also applicable to other types of fittings, such as drain fittings, air trap fittings, and ports for mounting temperature sensors and other accessories.

The invention claimed is:

1. A washer/extractor comprising:
a wash tub,
a tumbler mounted for rotational movement within said wash tub,
a wall of the washer/extractor being formed with an opening,
a hose connecting fitting mountable on said wall about said opening,
said connecting fitting having a one-piece plastic construction including a base plate positionable adjacent an outer surface of said wall in surrounding relation to said opening,
said connecting fitting having a tubular hose connection portion integral with said base plate extending outwardly of said base plate and the wall upon which the fitting is positioned,
said tubular hose connection portion defining a passageway communicating between a hose connected to said hose connection portion and said opening,
said hose connecting fitting including at least two clamping members disposed in spaced relation to a side of said base plate opposite that from which said hose connection portion extends, said clamping members being spaced from the base plate a distance greater than a thickness of said washer/extractor wall,
said wash tub wall opening having a key hole configuration designed for receiving said hose connecting fitting clamping members upon positioning of said connecting fitting on said wall during mounting in a first position and which upon rotation of said hose connecting fitting to a second position relative to said opening locates said clamping members with a mounting portion of said wall disposed between each clamping member and base plate, and
a respective fastener positionable through said wall mounting portion and connectable between said base plate and each clamping member for securely retaining said connecting fitting in mounted position in said second position with said wall mounting portion in secure interposed clamped relation between said clamping members and the base plate.

2. The washer/extractor of claim 1 in which said clamping members are disposed on opposite sides of said base plate.

3. The washer/extractor of claim 2 in which said base plate has a substantially rectangular configuration, and said clamping members are disposed adjacent diametrically opposed corners of said base plate.

4. The washer/extractor of claim 3 in which said clamping members are disposed in parallel relation to each other.

5. The washer/extractor of claim 3 in which said clamping members each have a peripheral end disposed inwardly of a respective outer edge of said base plate.

6. The washer/extractor of claim 3 in which said wall opening has a substantially rectangular configuration sized smaller than said base plate wall with a pair of said mounting wall portions disposed at diametrically opposed corners thereof.

7. The washer/extractor of claim 6 in which said hose connecting fitting is positionable in a first position with said clamping members disposed adjacent diametrically disposed corners of opening opposite said mounting wall portions and is rotated 90° to said second position.

8. The washer/extractor of claim 1 in which said fastener is a tapping screw.

9. The washer/extractor of claim 1 in which said wall mounting portion and base plate have respective apertures that are in aligned relation to each other when said fitting is rotated to the second position.

10. The washer/extractor of claim 9 in which said clamping member has an enlarged thickness nib for receiving the end of said self tapping screw.

11. The washer/extractor of claim 1 in which said clamping members each include a clamping arm portion disposed in parallel spaced relation to said base plate and a connecting portion integrally connecting said clamping arm portion and said base plate.

12. The washer/extractor of claim 1 in which said hose connecting portion extends at an acute angle to said base plate.

13. The washer/extractor of claim 1 including a sealing member interposed between an outer side of said wash tub wall and said base plate in surrounding relation to said wall opening.

14. The washer/extractor of claim 13 in which said sealing member is an O-ring, and said base plate is formed with a recess for partially receiving and retaining said sealing member during rotation of said connecting fitting from said first position to said second position.

15. The washer/extractor of claim 1 in which said wall is a rear wall of said wash tub, and said tubular portion defines a liquid flow passageway communicating with said opening, and into an interior of said wash tub.

* * * * *